No. 619,912. Patented Feb. 21, 1899.
W. SUTCLIFFE.
DEVICE FOR SEPARATING DUST FROM VARIOUS MATERIALS.
(Application filed Oct. 3, 1898.)
(No Model.) 2 Sheets—Sheet 1.

Witnesses
G. S. Elmore.
Arthur Ashley

Inventor
William Sutcliffe
By Philip T. Dodge
Att.

THE NORRIS PETERS CO., PHOTO-LITHO., WASHINGTON, D. C.

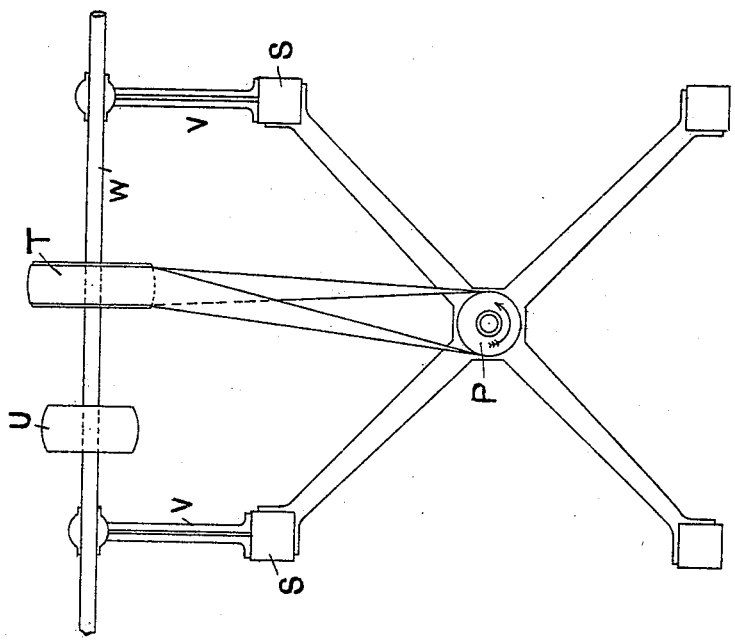
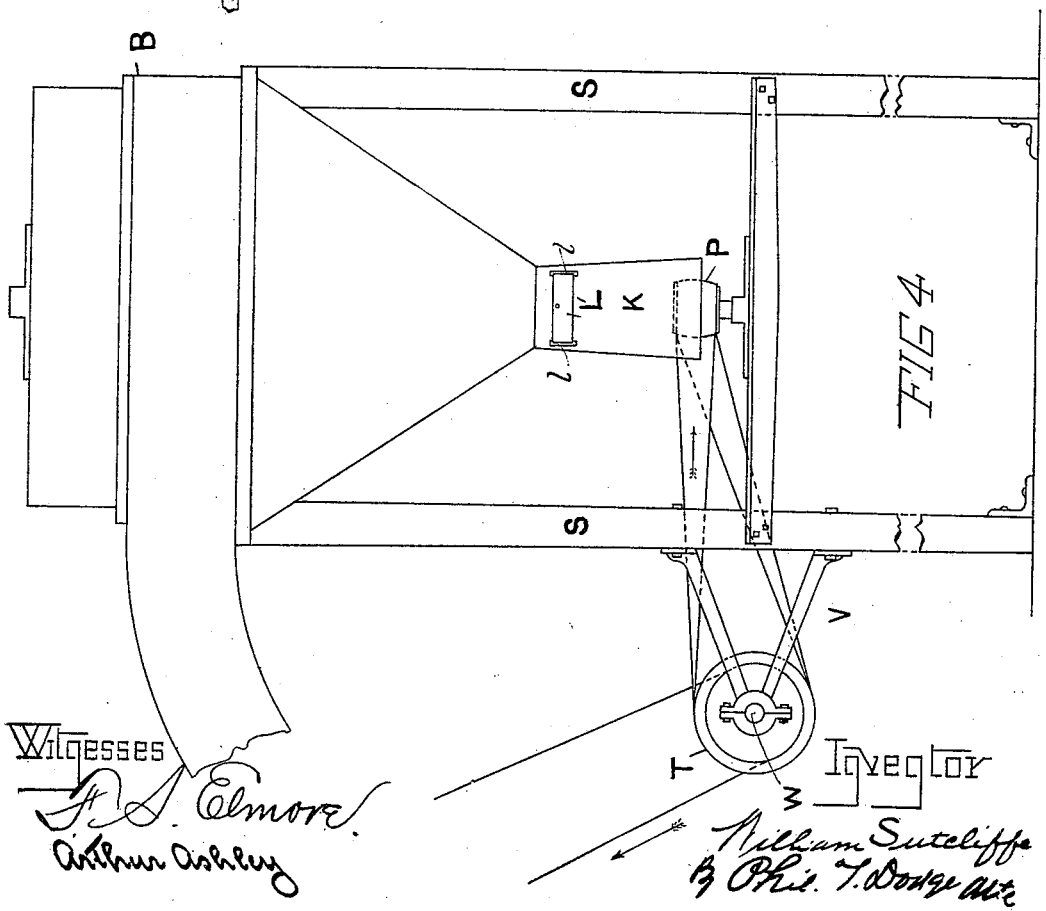

UNITED STATES PATENT OFFICE.

WILLIAM SUTCLIFFE, OF SOWERBY BRIDGE, ENGLAND.

DEVICE FOR SEPARATING DUST FROM VARIOUS MATERIALS.

SPECIFICATION forming part of Letters Patent No. 619,912, dated February 21, 1899.

Application filed October 3, 1898. Serial No. 692,542. (No model.)

*To all whom it may concern:*

Be it known that I, WILLIAM SUTCLIFFE, a subject of the Queen of Great Britain, residing at Sowerby Bridge, in the county of York, England, have invented certain new and useful Improvements in Devices for Separating Dust from Various Materials, (for which application for patent was made in Great Britain on the 23d day of February, 1898, No. 4,548,) of which the following is a specification.

My invention relates to machines for separating dust from various materials, but especially from hay, straw, or the like, and has for its object to provide a device of this character in which the dust will, after separation from the material under treatment, be effectively exhausted and discharged from the machine, whereby such material will be delivered in a thoroughly-cleansed condition.

To these ends the invention comprises a separator provided with means for establishing a vortex air-current therein to separate the dust from the material, together with means at one end of the machine for controlling the admission of air and means at its opposite end for inducing an air-current through and discharging it from the machine to exhaust the separated dust therefrom.

The invention further consists in the details of construction and combination of parts more fully hereinafter described.

Figure 1:
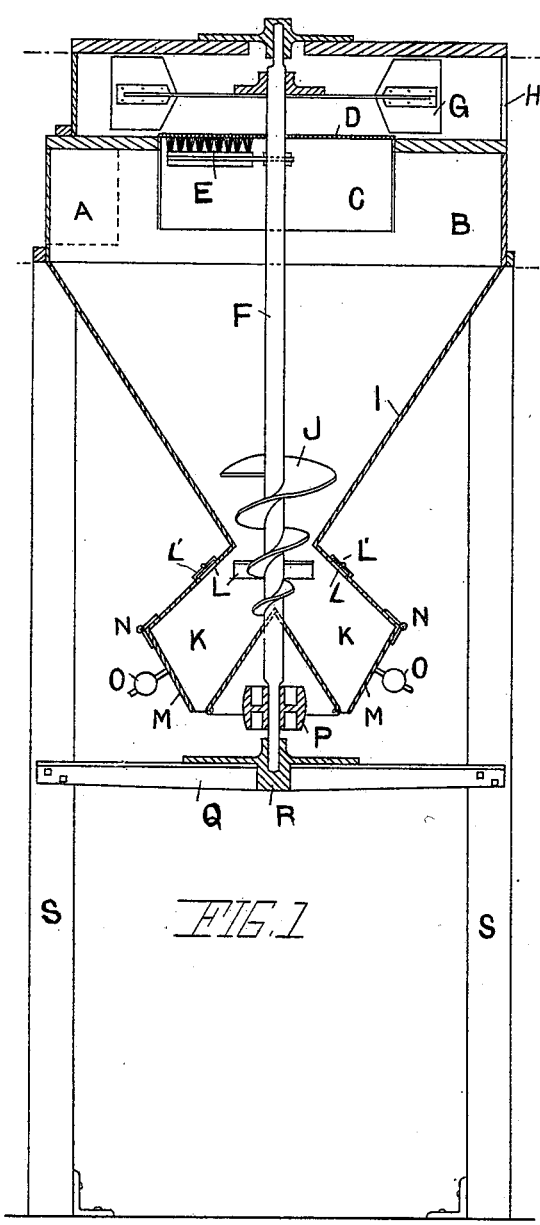
Figure 2:
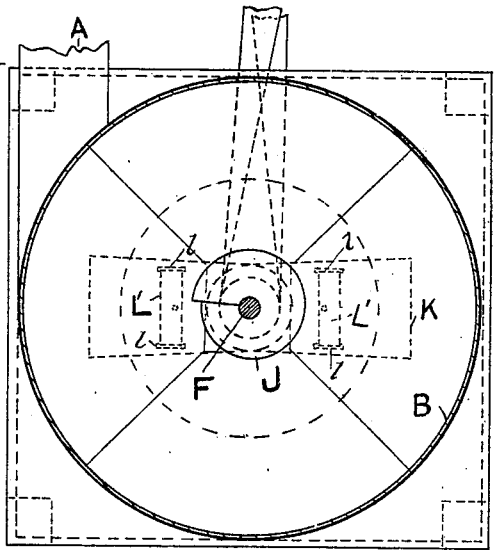
Figure 3:
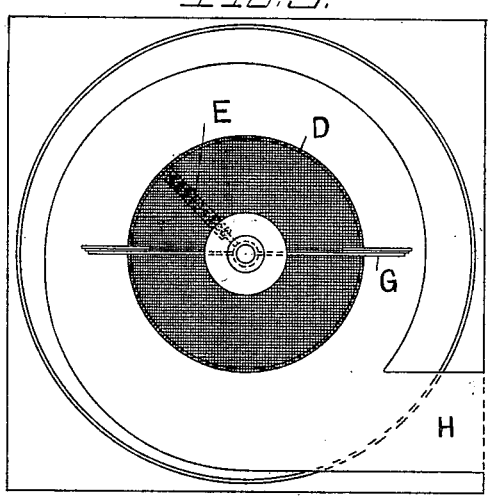

In the accompanying drawings, Figure 1 is a vertical longitudinal section through the separator. Fig. 2 is a horizontal section through the bottom of the cylindrical chamber. Fig. 3 is a top plan view, the top of the fan-case being removed. Fig. 4 is a side elevation. Fig. 5 is a top plan view of the driving mechanism.

Referring to the drawings, B indicates a cylindrical separating-chamber closed at its top, with the exception of a central discharge-opening, and open at its bottom for communication with the chamber below. An air-current, bringing with it the material to be treated, enters cylindrical chamber B tangentially through a suitable flue A, whereby a vortex motion is imparted to said air-current, as is customary in this class of machines. This air-current may be drawn or forced into said chamber in any desired or customary manner. I is a second chamber, situated below the chamber B and forming practically a continuation thereof. This chamber is preferably square in cross-section and in the form of an inverted pyramid, being connected at its base to the upper cylindrical chamber B, and terminating near its vertex in two discharge-spouts K K. These discharge-spouts are controlled by doors M M, hinged at N N and provided with weights O O, which latter serve to maintain them in their normal positions. The weights may be varied according to the material under treatment. It will be observed that the doors M M normally remain partially open, the purpose of which will be set forth later.

C is a cylindrical casing depending from and forming the central discharge-opening through the top of chamber B, through which opening the dust passes in its exit from the machine. D is a finely-perforated metallic plate covering said discharge-opening and serving to prevent the escape of any of the material under treatment, which might otherwise possibly be carried along and pass out with the escaping air and dust.

E is a brush attached to a central shaft F and revolving therewith for the purpose of brushing the under side of perforated plate D to remove any particles of the material which might otherwise adhere thereto and choke the same.

A central shaft F extends longitudinally through the separator, being journaled at its upper end in suitable bearings and seated at its lower end in step R, situated at the center of cross-struts Q, which connect diagonally the supporting-legs S of the machine. The shaft F is rotated by means of a pulley P, mounted thereon at its lower end. Motion is imparted to pulley P through the medium of a second pulley T, connected therewith by suitable belting. Pulley T is mounted on a drive-shaft W, journaled in suitable bearings at the ends of brackets V V, attached to and extending horizontally from two of the supporting-legs S S of the machine. The drive-shaft W and pulley T in turn receive motion from a drive-pulley U, also mounted on said drive-shaft, and which latter is in turn in belt connection with any suitable power-transmitting medium.

J is a spiral conveyer-blade attached to and revolved by the shaft F. This conveyer is situated in the open discharge end of chamber I and assists in discharging the cleansed material therefrom.

L L are air-openings formed in the upper face of discharge-spouts K K. These openings are controlled by sliding plates L' L', seated beneath flanges $l\ l$, which overlie their ends, as illustrated in Figs. 2 and 4. These air-openings serve alone or in conjunction with doors M M, which normally remain partially open, as heretofore stated, to admit a current of air, which passes centrally up through the machine and out through the central discharge-opening C, formed in the top of chamber B, and thence out through opening H. This current carries with it the dust separated from the material operated upon. In this feature of the central air-current passing up through the separator resides the essential point of my invention and is of vital importance in the device, serving, as it does, to positively carry off from the machine the dust which has been separated from the material under treatment.

G is a fan of any ordinary construction inclosed in a suitable casing at the top of the machine and is situated directly over the central opening C. This fan is mounted upon and rotated by the central shaft F and serves to draw up through the machine the central air-current and with it the separated dust and to discharge the same through the opening H. (Illustrated in full lines in Fig. 3.)

From the foregoing description it will be seen that I produce a separator in which the separated dust is thoroughly and positively removed from and discharged outside of the machine. In accomplishing this removal of the dust I believe myself to be the first to employ a current of air (aside from the vortex current) which passes directly through the machine, and as this feature forms the gist of my invention I do not limit myself to the herein-described details by which it is in this particular instance attained.

It will therefore be understood that the different parts of the machine may be variously constructed and modified in any manner for the better accomplishment of this end without departing from the limits or spirit of my invention.

Having thus described my invention, what I claim is—

1. In a dust-separating machine, the combination with means for establishing a vortex air-current therein, to separate the dust from the material under treatment, of means at one end of the machine for controlling the admission of air and means at the opposite end of the machine for inducing an air-current through and discharging it from the machine to exhaust the separated dust therefrom, substantially as described.

2. In a dust-separating machine, the combination with means near its upper end for establishing a vortex air-current, to separate the dust from the material under treatment, of suitably-controlled air-openings admitting air at its lower end, a fan at its upper end adapted to induce an air-current up through the machine, said machine having a discharge-opening H communicating with the fan and through which the air and dust are discharged, substantially as described.

3. A separating apparatus, having a cylindrical separating-chamber B and an exhaust-chamber above the same, provided with a discharge-opening, means for producing a vortex air-current in the separating-chamber, means for the admission of air at the lower end of the machine, a fan in the exhaust-chamber and a screen between the exhaust and separating chambers, said machine being provided below the air-openings with a discharge-opening, substantially as described.

In witness whereof I have hereunto signed my name, this 20th day of September, 1898, in the presence of two subscribing witnesses.

WILLIAM SUTCLIFFE.

Witnesses:
ARTHUR PETTITT,
MALCOLM COLLINSON.